(12) United States Patent  
Möhler et al.

(10) Patent No.: US 12,124,454 B2
(45) Date of Patent: Oct. 22, 2024

(54) SHADOW EXPERIMENTS FOR SERVERLESS MULTI-TENANT CLOUD SERVICES

(71) Applicant: International Business Machines Corporation, Armonk, NY (US)

(72) Inventors: Gregor Möhler, Stuttgart (DE); Oliver Koeth, Stuttgart (DE); Timo Kussmaul, Boeblingen (DE); Michael Haide, Jettingen (DE); Torsten Steinbach, Holzgerlingen (DE); Alexander Eckert, Boeblingen (DE); Sachin Lingadahalli Vittal, Mannheim (DE); Michael Behrendt, Sindelfingen-Maichingen (DE); Manuela Kohler, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/984,411

(22) Filed: Aug. 4, 2020

(65) Prior Publication Data

US 2022/0043822 A1 Feb. 10, 2022

(51) Int. Cl.
*G06F 16/2455* (2019.01)
*G06F 16/242* (2019.01)
(Continued)

(52) U.S. Cl.
CPC ...... *G06F 16/24553* (2019.01); *G06F 16/244* (2019.01); *G06F 16/24573* (2019.01);
(Continued)

(58) Field of Classification Search
None
See application file for complete search history.

(56) References Cited

U.S. PATENT DOCUMENTS 8,321,359 B2 11/2012 Buchs
8,688,714 B1 4/2014 Upstill
(Continued)

FOREIGN PATENT DOCUMENTS

CN 109804437 A 5/2019
CN 116158047 A 5/2023
(Continued)

OTHER PUBLICATIONS

Jothish, "Supervised Machine Learning: Model Validation, a Step by Step Approach," 2019 (Year: 2019).*
(Continued)

*Primary Examiner* — Yu Zhao
(74) *Attorney, Agent, or Firm* — Amin, Turocy & Watson, LLP

(57) ABSTRACT

Aspects of the present invention disclose a method, computer program product, and system for query execution in a multi-tenant cloud service. The method includes one or more processors determining category classes for service queries. The method further includes sending for execution, a selected number of service queries from one of the determined category classes to a shadow query engine. Respective service queries of the categorically classified service queries comprise a different set of configuration parameter values for the shadow query engine. The method further includes recording metadata for the selected number of service queries of the one category class executed on said shadow query engine. The method further includes determining correlations between the recorded metadata. The method further includes determining, from the determined correlations, optimal configuration parameter values comprising optimal configuration parameters for executing the selected number of service queries of the one category classes.

17 Claims, 7 Drawing Sheets

(51) Int. Cl.
*G06F 16/2457* (2019.01)
*G06F 16/248* (2019.01)
*G06F 16/25* (2019.01)
*G06F 16/28* (2019.01)

(52) U.S. Cl.
CPC .......... *G06F 16/248* (2019.01); *G06F 16/256* (2019.01); *G06F 16/284* (2019.01)

(56) References Cited

U.S. PATENT DOCUMENTS

| | | | | |
|---|---|---|---|---|
| 9,141,665 | B1* | 9/2015 | Munro | G06F 16/2453 |
| 11,093,714 | B1* | 8/2021 | Bhatia | G06N 3/044 |
| 2005/0177557 | A1* | 8/2005 | Ziauddin | G06F 16/217 |
| 2010/0131440 | A1* | 5/2010 | Chen | G06F 9/44505 706/15 |
| 2011/0252012 | A1 | 10/2011 | Kanduri | |
| 2013/0024440 | A1* | 1/2013 | Dimassimo | G06F 16/248 707/706 |
| 2016/0323145 | A1* | 11/2016 | Anderson | H04L 67/1097 |
| 2018/0060132 | A1* | 3/2018 | Maru | G06F 16/24553 |
| 2018/0060393 | A1* | 3/2018 | Kalathuru | G06F 16/282 |
| 2019/0229992 | A1* | 7/2019 | Margoor | G06F 16/217 |
| 2019/0244119 | A1 | 8/2019 | Farri | |
| 2019/0361915 | A1 | 11/2019 | Weaver | |
| 2020/0026695 | A1 | 1/2020 | Yan | |
| 2020/0036687 | A1 | 1/2020 | May | |
| 2020/0356873 | A1* | 11/2020 | Nawrocke | G06F 16/24561 |
| 2020/0379963 | A1* | 12/2020 | Lopes | G06F 11/3419 |
| 2021/0117425 | A1* | 4/2021 | Rao | H04L 41/0806 |

FOREIGN PATENT DOCUMENTS

| | | |
|---|---|---|
| DE | 112021003401 T5 | 5/2023 |
| GB | 2612565 A | 5/2023 |
| WO | 2019184739 A1 | 10/2019 |
| WO | 2022029593 A1 | 2/2022 |

OTHER PUBLICATIONS

Mell et al., "The NIST Definition of Cloud Computing", National Institute of Standards and Technology, U.S. Department of Commerce, NIST Special Publication 800-145, Sep. 2011, 7 pages.

International Search Report and Written Opinion, International Application No. PCT/IB2021/057031, International Filing Date Aug. 2, 2021.

* cited by examiner

100

| 102 | DETERMINING CATEGORY CLASSES |

| 104 | SENDING, FOR EXECUTION, A SELECTED NUMBER OF SERVICE QUERIES OF ONE OF THE CATEGORY CLASSES TO A SHADOW QUERY ENGINE |

| 106 | RECORDING METADATA FOR THE SELECTED NUMBER OF THE OF SERVICE QUERIES |

| 108 | DETERMINING CORRELATIONS |

| 110 | DETERMINING, FROM THE CORRELATIONS, OPTIMAL CONFIGURATION PARAMETER VALUES |

| 112 | APPLYING THE CONFIGURATION WITH THE OPTIMAL CONFIGURATION PARAMETER VALUES FOR AN EXECUTION TO AN EXTENDED SET OF SERVICE QUERIES OF THE SAME CLASS ON THE SHADOW QUERY ENGINE TO VALIDATE THE CONFIGURATION |

| 114 | UPON A POSITIVE RESULT OF THE VALIDATION, USING THE CONFIGURATION WITH THE OPTIMAL CONFIGURATION PARAMETER VALUES FOR AN EXECUTION OF FUTURE QUERIES OF THE SAME CATEGORY CLASS |

FIG. 1

SHADOW EXPERIMENTS FOR SERVERLESS MULTI-TENANT CLOUD SERVICES

BACKGROUND OF THE INVENTION

The present invention relates generally to the field of query optimization, and more particularly to an optimization of a query execution in a multi-tenant cloud service.

Information retrieval (IR) is the activity of obtaining information system resources that are relevant to an information need from a collection of those resources. Searches can be based on full-text or other content-based indexing. Information retrieval is the science of searching for information in a document, searching for documents themselves, and also searching for the metadata that describes data, and for databases of texts, images or sounds. An information retrieval process begins when a user enters a query into the system. Queries are formal statements of information needs, for example search strings in web search engines. In information retrieval a query does not uniquely identify a single object in the collection. Instead, several objects may match the query, perhaps with different degrees of relevancy.

A cloud service is any service made available to users on demand via the Internet from a cloud computing provider's servers as opposed to being provided from a company's own on-premises servers. Cloud services are designed to provide easy, scalable access to applications, resources and services, and are fully managed by a cloud services provider. Cloud storage is a model of computer data storage in which the digital data is stored in logical pools. The physical storage spans multiple servers (sometimes in multiple locations), and the physical environment is typically owned and managed by a hosting company. These cloud storage providers are responsible for keeping the data available and accessible, and the physical environment protected and running. People and organizations buy or lease storage capacity from the providers to store user, organization, or application data.

SUMMARY

Aspects of the present invention disclose a method, computer program product, and system for query execution in a multi-tenant cloud service. The method includes one or more processors determining category classes for service queries. The method further includes one or more processors sending for execution, a selected number of service queries from one of the determined category classes to a shadow query engine. The respective service queries of the categorically classified service queries comprise a different set of configuration parameter values for the shadow query engine. The method further includes one or more processors recording metadata for the selected number of service queries of the one category class executed on said shadow query engine. The metadata comprises, performance data, a query category class, and at least one value of related configuration parameter values. The method further includes one or more processors determining correlations between the performance data, the query category class, and the least one value of related configuration parameter values. The method further includes one or more processors determining, from the determined correlations, optimal configuration parameter values comprising optimal configuration parameters for executing the selected number of service queries of the one category classes.

In another embodiment, the method further includes one or more processors applying a configuration based on the optimal configuration parameter values to an extended set of service queries of a same category class on the shadow query engine. The method further includes one or more processors validating the applied configuration. In response to a positive validation result, the method further includes one or more processors executing future queries of the same category class of a query engine having identical characteristics to the shadow query engine, using the configuration with the optimal configuration parameter values.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited. Preferred embodiments of the invention will be described, by way of example only, and with reference to the following drawings.

FIG. 1 depicts a block diagram of an embodiment of the inventive computer-implemented method for an optimization of a query execution in a multi-tenant cloud service, in accordance with embodiments of the present invention.

DETAILED DESCRIPTION

Figure 2:
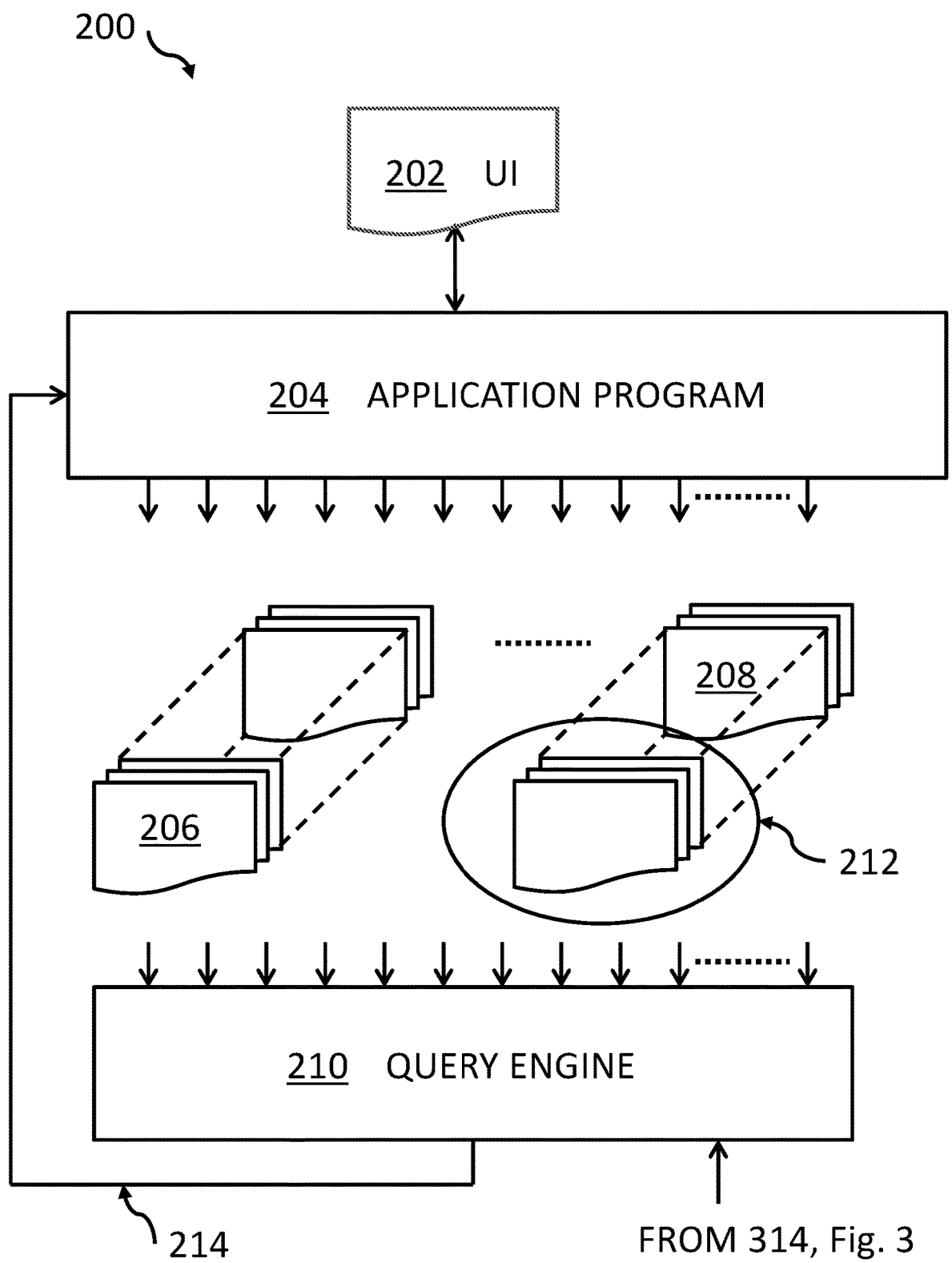
FIG. 2 depicts a block diagram of a general set up between an application program and a query engine, in accordance with embodiments of the present invention.

In the context of this description, the following conventions, terms and/or expressions may be used:

The term 'multi-tenant cloud service' may denote a program receiving data when called for execution and delivering results back typically to the calling system in a cloud computing environment. A detailed description of the cloud computing environment can be found below. In any case, a multi-tenant cloud service may be made available to a plurality of users.

The term 'service query' may denote a call from a first service (i.e., a first executed partial program) to another service (i.e., another executed partial program, such as to the query engine service), comprising parameter values for a query for data accessible by the second service. After having executed the query, the second service may return the retrieved data back to the calling service (i.e., first service). However, this general rule may be broken in case the shadow query engine is called. Here, the query may only be performed for the optimization process regarding configuration parameters for the related service. The retrieved data does not have to be delivered back to the original service having initiated the service call to the (main) query engine (instead of the shadow query engine).

The term 'shadow query engine' may denote a program typically implemented as a service in the multi-tenant cloud computing environment functioning identically to the productively used query engine, or query service for data retrieval from a database or another data storage. In particular, the shadow query engine may be configurable when being called with the same type of configuration and execution parameters as the regular query engine in operative use. Hence, the shadow query engine may be regarded as a copy of the query engine in operative use. In a special embodiment, the query engine and the shadow query engine may be implemented at least in parts (or completely) in hardware.

The term 'over-provisioned cloud computing environment' may denote that the cloud computing environment may be implemented and configured to provide more computing and service resources than would normally be required by a multitude of users and tenants. The excess capacity may be required to not have response time degradations in peak demand times of the one or more of the tenants.

The term 'machine-learning based system' may denote a system or service operating on the teaching or the artificial intelligence paradigm. The system is not programmed to follow procedural instructions but learns how to respond to incoming data based on learning by experiment approach according to well accepted and understood concepts. Thereby, supervised, semi-supervised, as well as unsupervised learning concepts may be used as part of an embodiment of the here proposed concept. The learning concepts may in particular apply to the classification task at hand to classify historic queries into classes of queries. For example, a maximum number of classes to use can be a starting parameter for the machine-learning service.

The term 'Spark'—in particular Apache Spark™ from the Apache® Foundation—may denote the known open-source distributed general-purpose cluster-computing framework. Spark™ provides an interface for programming entire clusters with implicit data parallelism and fault tolerance.

The term 'cloud computing'—and equivalently the term 'cloud service environment'—may in this context be interpreted as a model for enabling convenient, on-demand network access to a shared pool of configurable computing resources (e.g., networks, servers, storage, applications, and services) that can be rapidly provisioned and released with minimal management effort or service provider interaction. The cloud model promotes availability and is composed of at least five essential characteristics, three service models and four deployment models.

It may be noted that cloud software takes full advantage of the cloud paradigm by being service-oriented with a focus on statelessness (with exceptions), low coupling, modularity, and semantic interoperability.

The proposed computer-implemented method for an optimization of a query execution in a multi-tenant cloud service may offer multiple advantages, contributions and technical effects.

Embodiments of the present invention recognize that, the ever-increasing amount of structured, semi-structured and unstructured data in enterprise storage systems continuously increases the demand for effective data management and data retrieval tools. Hence, more and more data have to be analyzed, combined and retrieved in order to generate value out of the existing data lakes. Therefore, a growing plurality of databases and an over proportionally growth in queries against the data is the result. Very often, enterprise data are at least partially stored on cloud storage systems and accessed by services operated in cloud computing environments. However, whether deployed in-house or as a cloud service, data retrieval applications and services require more and more compute resources.

Consequently, embodiments of the present invention further recognize that programmers are looking increasingly for efficient data retrieval and query techniques, which is also true for large cloud computing environments in which query engines are often deployed as query services. In particular, relational databases, whether row or column oriented, have been optimized for query performance for decades. In-memory computing and ever-growing caching systems are currently used to decrease response time of database queries. Hence, there is room and also a demand for even better query techniques which help to reduce required compute resources for the same amount of queries.

Embodiments of the present invention may allow a constant optimization of configuration parameters settings for query engines in a multi-tenant cloud computing environment typically based on services. Example embodiments of the present invention can constantly inspect a large number of configuration variants at reasonable resource costs using spare capacities typically available in multi-tenant cluster systems in order to weather peak demands, but which are not used during regular resource consumption time periods.

Accordingly, embodiments of the present invention can optimize complex systems without knowing in which way different configurations may change the behavior, which can be achieved without breaking existing customer workloads and without negatively influencing typical response times and resource consumption of regularly deployed query engines.

Another advantage may be that the shadow execution by the shadow query engine may be done synchronously or delayed (i.e., performing the optimization based on historical queries). However, in such cases, the delayed execution may include dealing with access token expiration and changing input data sets.

In the following, additional embodiments of the method, also applicable to the related system, will be described. According to one permissive embodiment of the method, the configuration parameters, or more precise, the configuration parameter values, may comprise at least one selected out of the group a memory size, a buffer size, serialization options, a compression parameter value, networking parameter values, scheduling specific values, and execution options values. The values related to the configuration parameters may be Spark™ specific and may allow a wide variety of tuning parameter values to influence the function of the shadow query engine as well as the actually used query engine after the optimization process.

According to an embodiment of the method, each of the service queries may be related to a database query. A wide variety of databases may be used. For example, a relational database, an object-oriented database, a semi-structured database, a content management system, a text search engine, a no-SQL database (structured query language), and also services like Apache Solr™ (a known open-source search engine), or another known open-source search engine. Hence, the herein proposed concept may be applied to almost any database being influenced by parameter settings of its execution environment, in accordance with various embodiments of the present invention.

According to an advantageous embodiment of the method, the selected number of service queries of the one category class may originate from one group of users. One group of users may relate to one tenant in a multi-user cloud computing environment. Assuming that comparable queries relate to the single tenant, the query optimization may be tenant or customer specific. In another embodiment, the selected number of service queries may relate to a selected application of group of applications like an enterprise resource management system, a customer relationship management system or a supply chain management system. Accordingly, the query optimization may be application or application group specific.

According to another advantageous embodiment of the method, the extended set of service queries may originate from more than one group of users. Hence, the optimization achieved from example queries from one tenant may also be used for other tenants and thus, for other groups of users or application systems. Therefore, the query optimization reached for one user may also be used for other customers without requiring the same amount of system resources to determine optimized configuration parameters.

According to an example embodiment of the method, the category classes may relate to data definition operations in general. In particular, the data definition operations may be, but is not limited to, an SQL statement, a spatial query, a time-series query, a data join operation, a write access, a data delete operation and, an aggregation operation, a union operation, a data grouping, operation, an ordering statement or string operations. Further, the method may be applicable to any type of query in any type of database.

According to another advantageous embodiment of the method, the shadow query engine may be selected out of a set of spare query engines in an over-provisioned cloud computing environment. Accordingly, performance degradation of productive systems may be measurable, and no active user may see any response time degradations. Typically, in cloud computing environments some additional resources may be available to achieve the flexibility and elasticity the cloud environment services are built for.

According to another example embodiment of the method, the optimal configuration parameter values may reflect (i.e., be a function of) at least one operation constraint selected out of the group latency, throughput, resource usage and, a combination thereof. Hence, different priorities in respect to the optimization may be chosen by a system administrator.

According to one optional embodiment of the method, the category classes may be determined by applying a machine-learning based system to a set of historic queries for the query engine. A goal of such a feature may be to identify good differentiable classes. Supervised, semi-supervised, as well as, unsupervised machine-learning systems may be used for such classification tasks.

According to a further embodiment of the method, the multi-tenant cloud service may be a Spark™-based computing environment. Cloud computing environments based on the Spark™ technology (e.g., Apache® Spark™ of any version) are very popular nowadays and thus, a large community of users of such cloud computing environments may have the advantage of applying the here proposed concept. However, the inventive concept is not limited to Apache Spark™ and may also be implemented on or in other cloud computing frameworks.

In the following, a detailed description of the Figures will be given. All instructions in the Figures are schematic. Firstly, a block diagram of an embodiment of the inventive computer-implemented method for an optimization of a query execution in a multi-tenant cloud service is given, in accordance with various embodiments of the present invention. Afterwards, further embodiments, as well as embodiments of the query optimization system for an optimization of a query execution in a multi-tenant cloud service, will be described, in accordance with various embodiments of the present invention.

FIG. 1 depicts a block diagram of an example embodiment of the computer-implemented method 100 for an optimization of a query execution in a multi-tenant cloud service, in accordance with embodiments of the present invention.

In step 102, computer-implemented method 100 includes determining category classes for service queries. Then, in step 104 computer-implemented method 100 includes sending a selected number of service queries of one of the category classes (in particular, duplicate isolated experimental)—to a shadow query engine for an execution of the queries. For example, each of the categorically classified service queries comprises a different set of configuration parameter values for the shadow query engine. The selected number of service queries of one of the category classes is comparably low if compared to doing a total number of queries sent for execution in a predefined time period. The time period may be chosen in the context of the underlying application requiring the results of the queries. The time period can be a couple of seconds after one hour (e.g., 1 s, 10 s, 100 s, 1 min., 10 min., 1 h) but may stay in the range of about 10% of the total queries in the selected time. In addition, the shadow query engine can be equal in terms of the characteristics to the real in use query engine on which the queries are executed.

In another embodiment, instead of each query of a class using different configuration parameters when being executed by the shadow query engine, the shadow query engine may also run the same query with different configuration parameters, which can enhance the data volume being recorded and analyzed in the next steps. In other embodiments, a mixture of both alternatives is considered a viable option.

In step 106, computer-implemented method 100 further includes recording metadata for the selected number of the service queries of the one category class executed on the shadow query engine. Thereby, the metadata comprises at least one selected out of the group comprising: performance data, a query category class and at least one value of related configuration parameter values. Accordingly, computer-implemented method 100 can collect data describing the characteristics and the actual functioning of the shadow query engine.

In step 108, computer-implemented method 100 also includes determining correlations. In various embodiments, computer-implemented method 100 determines correlations between the performance data, the query category class, and the least one value of related configuration parameter values. Then, in step 110 computer-implemented method 100 includes determining, from the correlations, optimal configuration parameter values. In various embodiments, the optimal configuration parameter values comprise optimal configuration parameters for executing of the selected number of service queries of the one of the category classes.

In step 112, computer-implemented method 100 includes applying the configuration with the initial optimal configuration parameter values for an execution to an extended set of service queries of the same class on the shadow query engine to validate the configuration. The extended set could (in contrast to the selected number of queries which may come only from one user of one tenant in a multi-user cloud computing environment) originate from separate users of the same tenant or a mixture of queries from different tenants. In an example embodiment, computer-implemented method 100 initiates step 112 as a second stage of the process of FIG. 1, in accordance with embodiments of the present invention.

In step 114, computer-implemented method 100 includes, upon a positive result of the validation (from step 112), using the configuration with the optimal configuration parameter values for an execution of future queries of the same category class of a primary or the active query engine (in contrast to the shadow query engine). In example embodiments, the query engine and the shadow query engine have identical characteristics. As a result of the method, an optimized execution parameter value setting for the active query engine can be realized based on the configuration parameters setting determined by the shadow query engine during idle times of cloud computing environment.

FIG. 2 depicts a block diagram of a general set-up 200 between an application program 204 and a query engine 210, in accordance with embodiments of the present invention. Application program 204 may have a user interface 202. User interface 202 can, on an ongoing basis, generate queries symbolized as different classes 206, 208, which are sent to the query engine 210 for execution and returning results of queries back to application program 203, symbolized by the data path 214.

In various embodiments, the described functions are implemented as services in a cloud computing environment serving the plurality of tenants and users. In additional example embodiments no research execution environment (i.e., configuration and/or resources) can be maintained per tenant or per user. The query engine 210 may be any type of engine, such as implemented using a Spark™ computing framework. In another aspect, different query engines can be used across tenants based on proper query models. In this aspect, different shadow query engines can also be used. Thus, the defined system utilizes some over-provisioning to react to query demand spikes. Accordingly, the system may typically have some spare capacity, which may not be provisioned to customers (i.e., tenants).

In further embodiments, the query engine can be called with different configuration parameter value settings (e.g., memory size, serialization options, etc.), which can affect the execution characteristics (e.g., latency, throughput, etc.) of the instance(s) of the query engine(s). Some queries may only run with specific configurations because otherwise errors like out-of-memory may happen. Additionally, the configuration parameter settings are determined by query service and not by user and more tenants. Furthermore, certain classes of queries require different configuration parameter settings for best user experience for a given system capacity.

Hence, embodiments of the present invention recognize the need to solve an optimization problem. Constantly, optimal configuration parameter values have to be selected to execute newly arriving queries. An appropriate set of configuration values have to be chosen that the system provides in an "idle" state. Hence, embodiments of the present invention recognize the need for solving and exploring a complex optimization problem with a large space of variance. In addition, the team running the query engine may only have limited insight into the internals of the query engine. Embodiments of the present invention recognize that typically known solutions rely on the experience of the operators using a fixed, averaging set of configuration parameters. Further, the selected set of queries 212 of one class is encircled (in the depiction in FIG. 2), which plays a role in FIG. 3.

Figure 3:
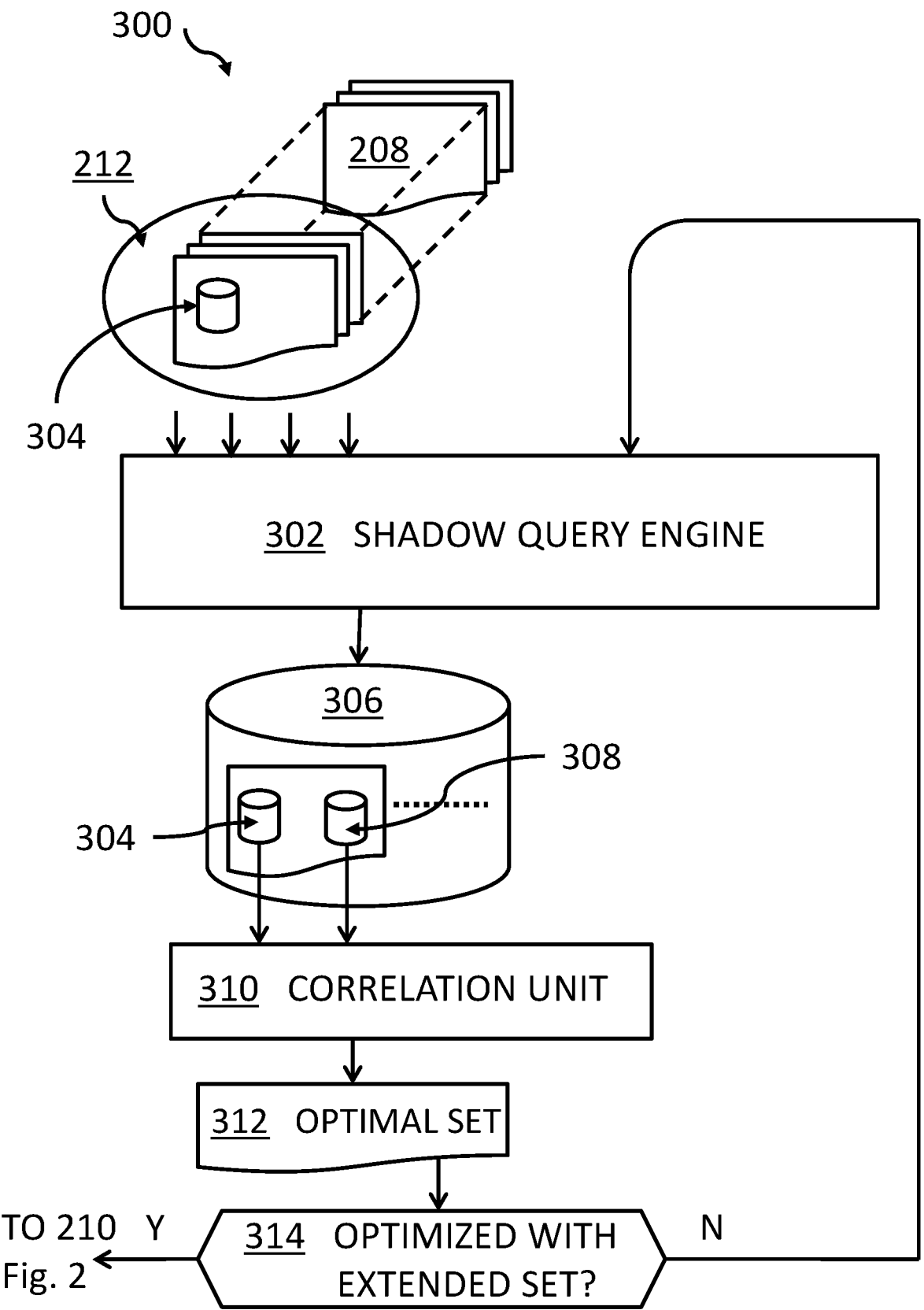
FIG. 3 depicts a block diagram of a n embodiment of the proposed inventive concept depicting main building blocks, in accordance with embodiments of the present invention.

FIG. 3 shows a block diagram of an example embodiment 300 of the proposed inventive concept showing main building blocks, in accordance with embodiments of the present invention. Repeated from FIG. 2 is a class of queries 208, to which a selected set of configuration parameter values 304 is related. Also shown is the shadow query engine 302 executing the selected set of queries 212 of one query class. In example embodiments, the query engine 302 in particular is hidden for the user and not in the productive environment to return the results back to the user. In another embodiment, the results of the queries do not play a further role because the results were not be used in further processing.

However, metadata 308 of the query execution are recorded in a specific storage area 306 and set in relationship to the queries and the selected set of configuration parameter values 304. Embodiments of the present invention can now activate a correlation unit 310 to determine correlations for the class of queries, the selected set of configuration parameter values, and resulting performance data, such as memory usage, response time, throughput, etc. Based on the correlation analysis, embodiments of the present invention can then determine an optimized set 312 of configuration parameter values for the shadow query engine 302.

In determination 314, embodiments of the present invention can check whether the optimal set 312 is already based on an extended set of queries of the selected class. If the optimal set 312 is not based on an extended set of queries of the selected class (determination 314, NO branch), then the process returns back to the beginning and repeats the aforementioned flow of activities with the extended set of historic queries 208 of the same class. In this second stage, embodiments of the present invention can test and determine whether the determined optimal configuration parameter values for the shadow query engine 302 continue to be the same as for the selected set of queries 212. If the determined optimal configuration parameter values for the shadow query engine 302 do not continue to be the same as for the selected set of queries 212, then another set of a selected set of queries 212 is chosen. Accordingly, embodiments of the present invention can then continue to repeat the optimization process until determining an optimal configuration parameter value set 312 for the shadow query engine 302 for the selected class of queries. The extended set of historic queries 208 may be chosen from a plurality of tenants and/or users.

Hence, in case the optimal configuration parameter value set 312 is found based on the extended set of historic queries 208 of the class, embodiments of the present invention can transmit the set of optimal configuration parameters setting values to the query engine 210 (of FIG. 2) for utilization as the configuration parameter values for future queries of the selected class (determination 314, YES branch).

The process is repeated for other (e.g., all) classes of queries. Thereby, embodiments of the present invention can use spec capacities of the cloud computing environment. In various embodiments, the optimization process may only be performed during times when the cloud computing has spare capacities and not during usage peak times of the cloud computing resources.

Worthwhile mentioning is the fact that the sampling (i.e., the selection of the selected number of queries in the selected set of queries 212) can be based on a machine-learning (ML) based clustering of queries based on a dedicated, predefined distance function. The target classes can be based on constructs and/or operators used in the queries (e.g., aggregation, geo-spatially join, etc.), derived from a query parser. Also, characteristics of the data used as input for the query can be connected in the classification of the queries (e.g., distributed over more/less than n partitions), containing spatial data, derived from a specific source or targeted for a predefined data sink (e.g., reading from Kafka®, i.e., Apache Kafka® for stream processing) based data and written to COS (i.e., Cloud Object Store). However, any other data source/sink combination is possible.

Figure 4:
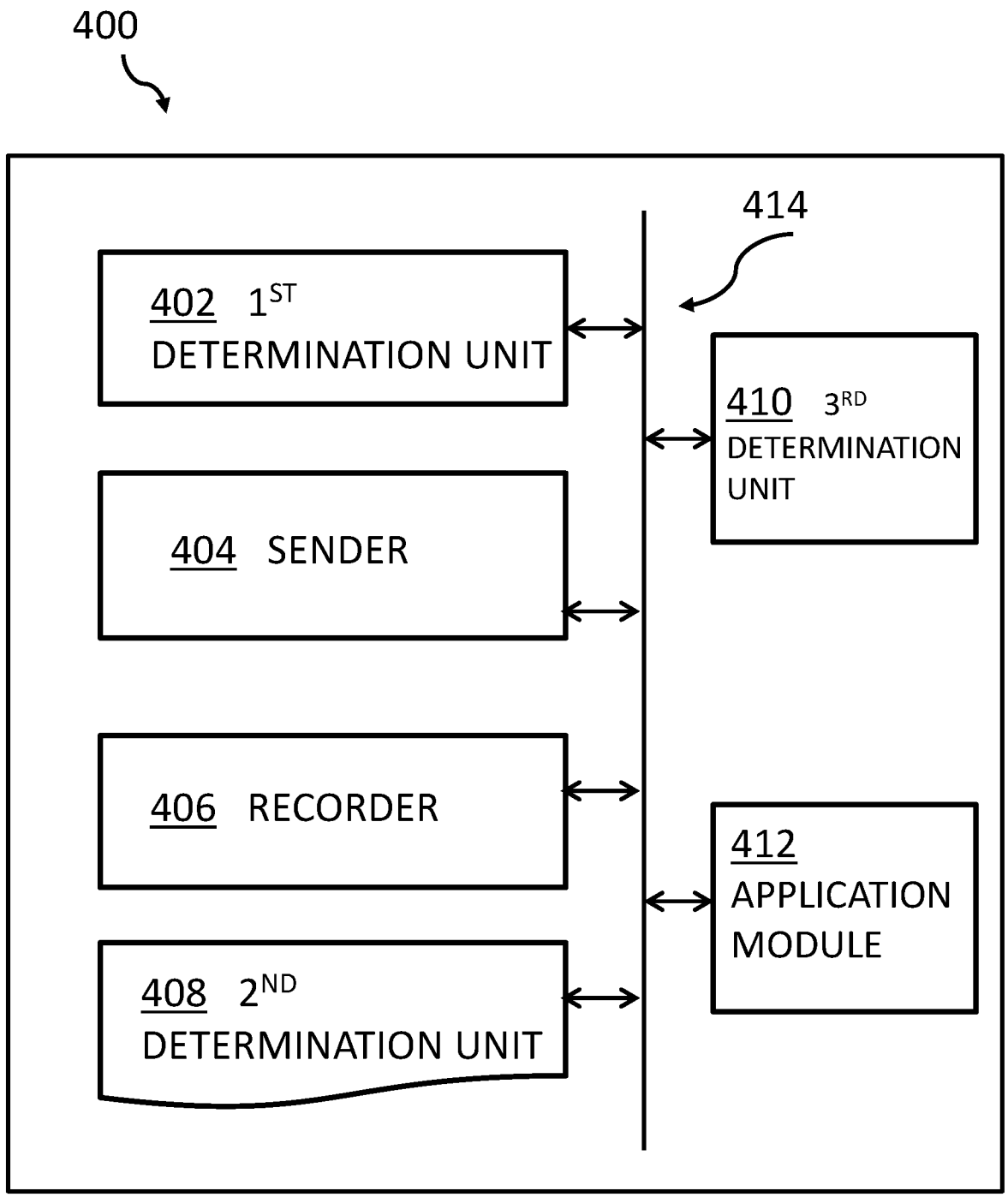
FIG. 4 depicts a block diagram of an embodiment of a query optimization system for an optimization of a query execution in a multi-tenant cloud service, in accordance with embodiments of the present invention.

FIG. 4 depicts a block diagram of an embodiment of a query optimization system 400 for an optimization of a query execution in a multi-tenant cloud service, in accordance with embodiments of the present invention. The query optimization system 400 includes a first determination means, in particular a $1^{st}$ determination unit 402, which is adapted for determining category classes for service queries. The query optimization system 400 further includes a sender means, in particular sender 404, which is adapted for sending, for execution, a selected number of service queries of one of the category classes to a shadow query engine. Thereby, each of the categorically classified service queries comprises a different set of configuration parameter values for the shadow query engine, in accordance with various embodiments of the present invention.

The query optimization system 400 also comprises recording means, in particular recorder 406, adapted for recording metadata for the selected number of the service queries of the one category class executed on the shadow query engine. In example embodiments, the metadata comprises at least one selected out of the group comprising, performance data, a query category class, and the least one value of related configuration parameter values, and a determination means, in particular the $2^{nd}$ determination unit 408, which is adapted for determining correlations. For example, at least one correlation between the performance data, the query category class, and the least one value of related configuration parameter values, and determination means. In particular the $3^{rd}$ determination unit 410, which is adapted for determining from the correlations optimal configuration parameter values comprising optimal configuration parameters for executing of the selected number of service queries of the one of the category classes.

Furthermore, the query optimization system 400 also comprises application means, in particular the application module 412, which is adapted for applying the configuration with the optimal configuration parameter values for an execution to an extended set of service queries of the same class on the shadow query engine to validate the configuration. The sender means (i.e., the sender 404) are also adapted for using the configuration with the optimal configuration parameter values for an execution of future queries of the same category class of a query engine if a positive result of the validation has been found. Thereby, in various embodiments, the query engine and the shadow query engine can have identical characteristics.

It may be noted that the units and modules of the query optimization system 400 can be in communicative contact for a signal exchange. In particular, the $1^{st}$ determination unit 402, the sender 404, the recorder 406, the $2^{nd}$ determination unit 408, the $3^{rd}$ determination unit 410, and the application module 412 are communicatively connected in such a way. Alternatively, the units and modules may be in communicative contact via the system internal bus system 414.

Figure 5:
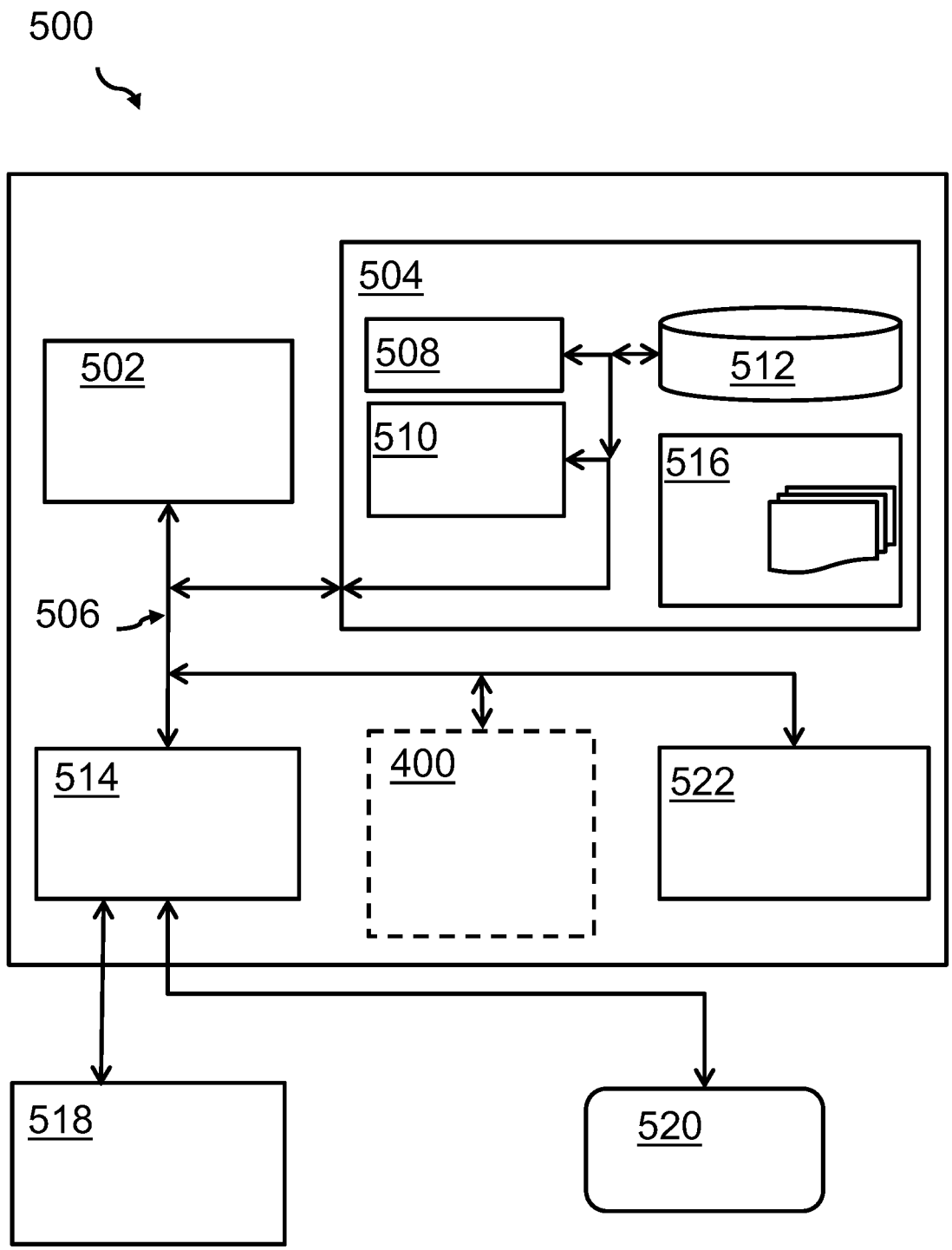
FIG. 5 depicts an embodiment of a computing system comprising the query optimization system according to FIG. 4, in accordance with embodiments of the present invention.

Embodiments of the invention may be implemented together with virtually any type of computer, regardless of the platform being suitable for storing and/or executing program code. FIG. 5 depicts, as an example, a computing system 500 suitable for executing program code related to the proposed method (e.g., at least one of many nodes in a multi-tenant cloud computing cluster), in accordance with various embodiments of the present invention.

The computing system 500 is only one example of a suitable computer system, and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general-purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in FIG. 5, computer system/server 500 is shown in the form of a general-purpose computing device. The components of computer system/server 500 may include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random-access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of the computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the query optimization system 400 for an optimization of a query execution in a multi-tenant cloud service may be attached to the bus system 506.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
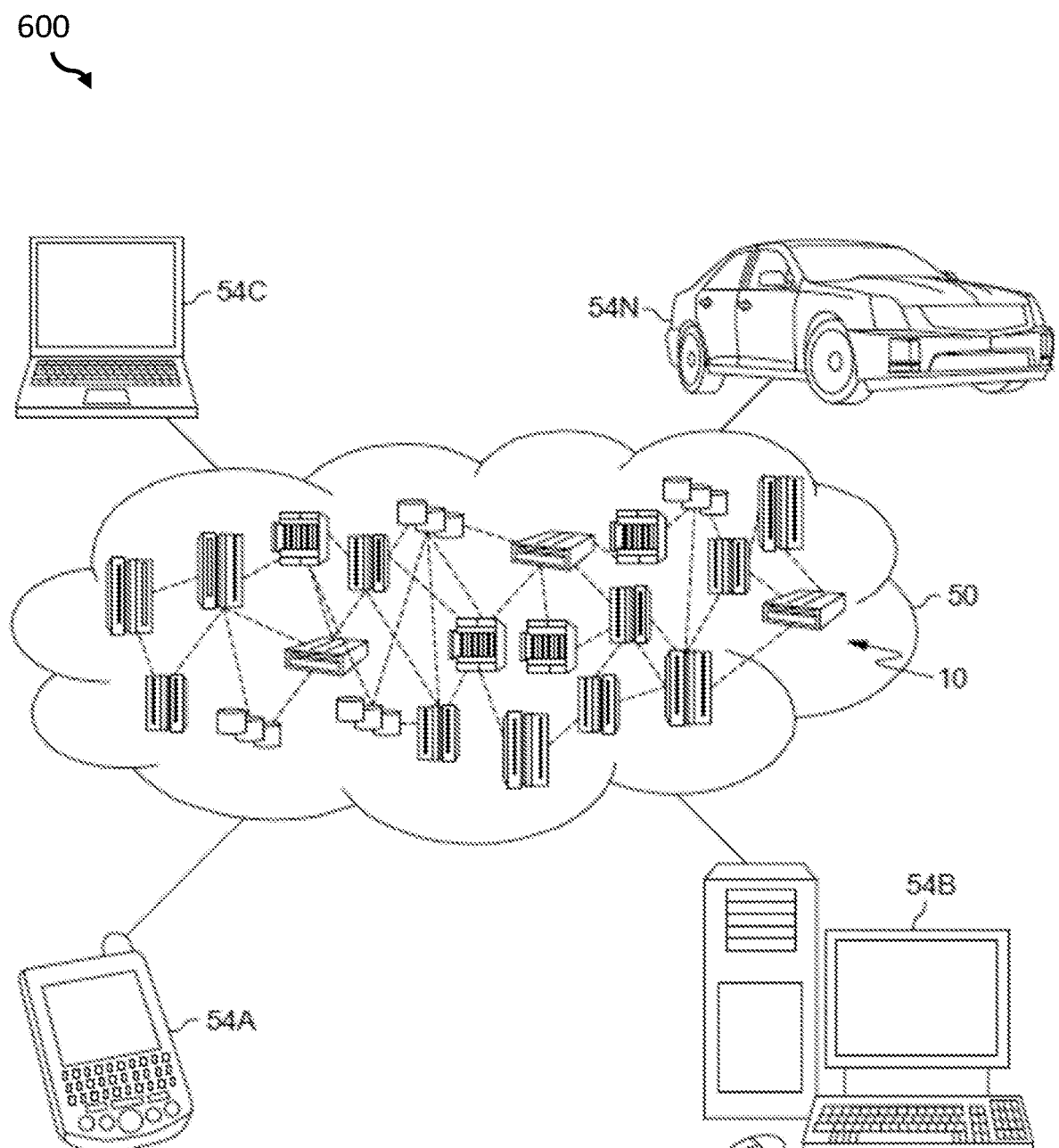
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
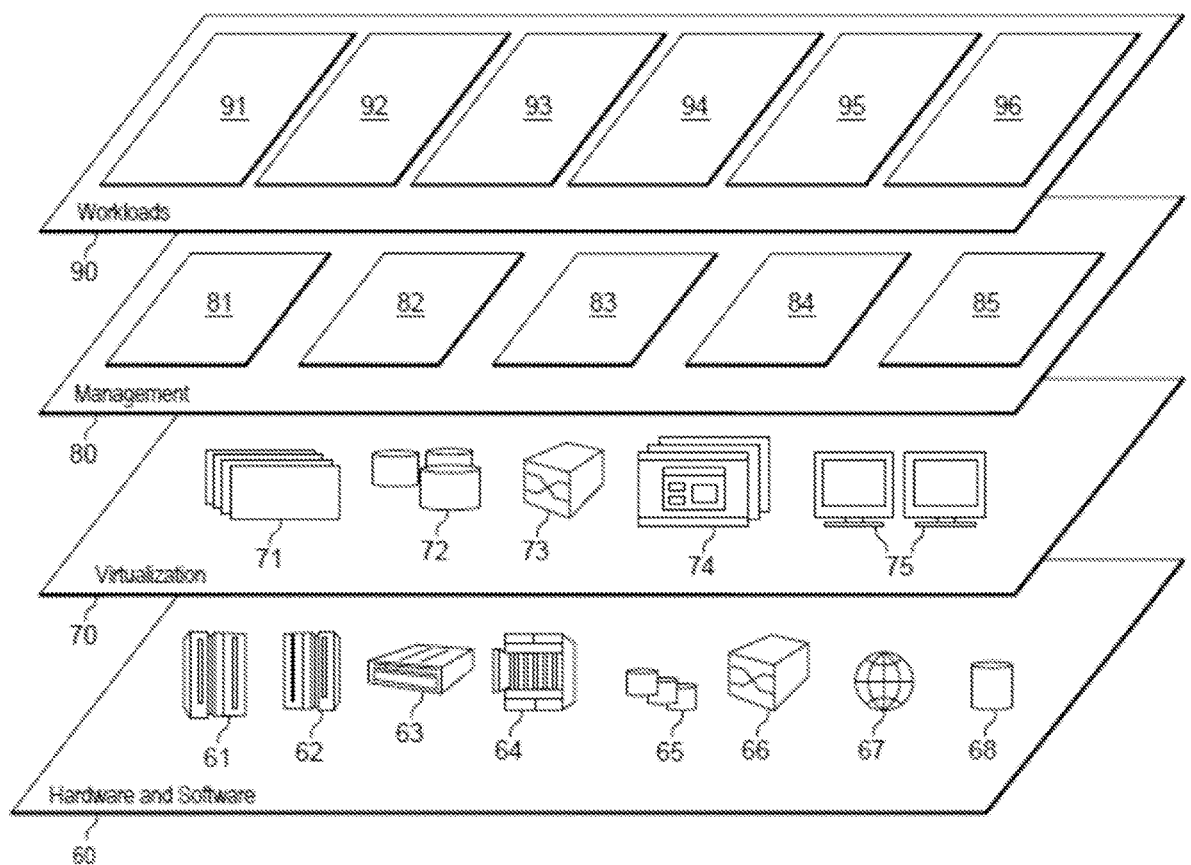
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software 96. In various embodiments of the present invention, software 96 is representative of a query optimization system, such as the query optimization system 400, of FIG. 4.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for query execution in a multi-tenant cloud service, the method comprising:
  sending, by one or more processors, for execution, a selected number of service queries from a particular category class of one or more category classes to a shadow query engine, wherein service queries of the selected number of service queries comprise a different set of configuration parameter values;
  recording, by the one or more processors, metadata for the selected number of service queries of the particular category class executed on the shadow query engine, wherein the metadata comprises performance data, a query category class, and at least one value of related configuration parameter values;
  determining, by the one or more processors, one or more correlations between the metadata;
  applying, by the one or more processors, a configuration to an extended set of service queries of a same category class on the shadow query engine based on a determined set of optimal hardware/software configuration parameter values for the first selected number of service queries from the particular category class, wherein the determined set of optimal hardware/software configuration parameter values is based on the determined one or more correlations between the metadata;

responsive to applying the configuration to the extended set of service queries, validating, by the one or more processors, that the configuration applied to the extended set of service queries of the same category class on the shadow query engine has a positive result; and responsive to validating that the result is positive, executing, by the one or more processors, on an active query engine while the active query engine is in use, future queries of the same category, wherein the active query engine has identical characteristics to the shadow query engine, and is configured with the determined set of optimal hardware/software configuration parameter values of the shadow query engine, wherein the determined set of optimal hardware/software configuration parameter values are determined by the shadow query engine during idle times of a cloud computing environment associated with the multi-tenant cloud service, and wherein the determined set of optimal configuration parameter values are the identical characteristics of the active query engine and the shadow query engine.

2. The computer-implemented method of claim 1, wherein the configuration parameters comprise at least one selected from the group consisting of a memory size, a buffer size, serialization options, a compression parameter value, networking parameter values, scheduling specific values, and execution options values.

3. The computer-implemented method of claim 1, wherein the service queries are related to a database query.

4. The computer-implemented method of claim 1, wherein the selected number of service queries of the one category class originates from one group of users.

5. The computer-implemented method of claim 1, wherein the extended set of service queries originates from more than one group of users.

6. The computer-implemented method of claim 1, wherein the one or more category classes relate to data definition operations.

7. The computer-implemented method of claim 6, further comprising:

selecting, by the one or more processors, the shadow query engine out of a set of spare query engines in an over-provisioned cloud computing environment.

8. The computer-implemented method of claim 1, wherein the optimal configuration hardware/software parameter values reflect at least one operation constraint selected from the group consisting of latency, throughput, and resource usage.

9. The computer-implemented method of claim 1, further comprising:

determining, by the one or more processors, the one or more category classes by applying a machine-learning based system to a set of historical queries for the query engine.

10. A computer program product for query execution in a multi-tenant cloud service, the computer program product comprising:

one or more computer readable storage media and program instructions stored on the one or more computer readable storage media, the program instructions comprising:

program instructions to send for execution, a selected number of service queries from a particular category class of one or more category classes to a shadow query engine, wherein service queries of the selected number of service queries comprise a different set of configuration parameter values;

program instructions to record metadata for the selected number of service queries of the particular category class executed on the shadow query engine, wherein the metadata comprises performance data, a query category class, and at least one value of related configuration parameter values;

program instructions to determine one or more correlations between the metadata;

program instructions to apply a configuration to an extended set of service queries of a same category class on the shadow query engine based on a determined set of optimal hardware/software configuration parameter values for the first selected number of service queries from the particular category class, wherein the determined set of optimal hardware/software configuration parameter values is based on the determined one or more correlations between the metadata;

responsive to applying the configuration to the extended set of service queries, program instructions to validate that the configuration applied to the extended set of service queries of the same category class on the shadow query engine has a positive result; and responsive to validating that the result is positive, program instructions to execute, on an active query engine while the active query engine is in use, future queries of the same category, wherein the active query engine has identical characteristics to the shadow query engine, and is configured with the determined set of optimal hardware/software configuration parameter values of the shadow query engine, wherein the determined set of optimal hardware/software configuration parameter values are determined by the shadow query engine during idle times of a cloud computing environment associated with the multi-tenant cloud service, and wherein the determined set of optimal hardware/software configuration parameter values are the identical characteristics of the active query engine and the shadow query engine.

11. The computer program product of claim 10, wherein the configuration parameters comprise at least one selected from the group consisting of a memory size, a buffer size, serialization options, a compression parameter value, networking parameter values, scheduling specific values, and execution options values.

12. The computer program product of claim 10, wherein the service queries are related to a database query.

13. A computer system for query execution in a multi-tenant cloud service, the computer system comprising:
one or more computer processors;
one or more computer readable storage media; and
program instructions stored on the computer readable storage media for execution by at least one of the one or more processors, the program instructions comprising:
program instructions to send for execution, a selected number of service queries from a particular category class of one or more category classes to a shadow query engine, wherein service queries of the selected number of service queries comprise a different set of optimal hardware/software configuration parameter values;
program instructions to record metadata for the first selected number of service queries of the particular category class executed on the shadow query engine, wherein the metadata comprises performance data, a query category class, and at least one value of related configuration parameter values;
program instructions to determine one or more correlations between the metadata;
program instructions to apply a configuration to an extended set of service queries of a same category class on the shadow query engine based on a determined set of optimal hardware/software configuration parameter values for the first selected number of service queries from the particular category class, wherein the determined set of optimal hardware/software configuration parameter values is based on the determined one or more correlations between the metadata;
responsive to applying the configuration to the extended set of service queries, program instructions to validate that the configuration applied to the extended set of service queries of the same category class on the shadow query engine has a positive result; and
responsive to validating that the result is positive, program instructions to execute, on an active query engine while the active query engine is in use, future queries of the same category, wherein the active query engine has identical characteristics to the shadow query engine, and is configured with the determined set of optimal hardware/software configuration parameter values of the shadow query engine,
wherein the determined set of optimal hardware/software configuration parameter values are determined by the shadow query engine during idle times of a cloud computing environment associated with the multi-tenant cloud service, and
wherein the determined set of optimal hardware/software configuration parameter values are the identical characteristics of the active query engine and the shadow query engine.

14. The computer system of claim 13, wherein the optimal hardware/software configuration parameters comprise at least one selected from the group consisting of a memory size, a buffer size, serialization options, a compression parameter value, networking parameter values, scheduling specific values, and execution options values.

15. The computer system of claim 13, wherein each of the service queries is related to a database query.

16. The computer system of claim 13, wherein the selected number of service queries of the one category class originates from one group of users.

17. The computer system of claim 13, wherein the optimal hardware/software configuration parameter values reflect at least one operation constraint selected from the group consisting of latency, throughput, and resource usage.

* * * * *